United States Patent [19]

Rosenberg et al.

[11] 4,285,733
[45] Aug. 25, 1981

[54] CORROSION INHIBITING CONCRETE COMPOSITION

[75] Inventors: Arnold M. Rosenberg, Potomac; James M. Caidis, Ellicott City, both of Md.

[73] Assignee: W. R. Grace & Co., New York, N.Y.

[21] Appl. No.: 123,741

[22] Filed: Feb. 22, 1980

Related U.S. Application Data

[63] Continuation of Ser. No. 18,085, Mar. 6, 1979, abandoned.

[51] Int. Cl.³ ............................................. C04B 7/02
[52] U.S. Cl. ........................................ 106/98; 106/315
[58] Field of Search ............... 106/90, 97, 98, 314, 106/315

[56] References Cited

U.S. PATENT DOCUMENTS

| | | | |
|---|---|---|---|
| 3,210,207 | 10/1965 | Dodson et al. | 106/90 |
| 3,427,175 | 2/1969 | Angstadt et al. | 106/315 |
| 3,801,338 | 4/1974 | Whitaker | 106/315 |
| 3,972,723 | 8/1976 | Balle et al. | 106/314 |

OTHER PUBLICATIONS

Tonini et al., Chloride Corrosion of Steel in Concrete ASTM STP 629, 1977, pp. 89–99.

*Primary Examiner*—James Poer
*Attorney, Agent, or Firm*—Howard J. Troffkin

[57] ABSTRACT

This invention is directed to a concrete which is capable of inhibiting corrosion of metal pieces contained therein or in contact therewith comprising a high strength concrete formed from hydraulic cement and containing at least about 2 percent $Ca(NO_2)_2$ therein.

10 Claims, No Drawings

CORROSION INHIBITING CONCRETE COMPOSITION

This is a continuation of application Ser. No. 18,085, filed Mar. 6, 1979, now abandoned.

BACKGROUND OF THE INVENTION

The present application is directed to certain concrete compositions which have unexpectedly been found to completely substantially inhibit corrosion of metal pieces contained therein over a sustained period of time. The present invention is directed to a corrosion inhibiting concrete composition comprising a high strength concrete formed from a hydraulic cement and which contains at least about 2 percent calcium nitrite therein.

Concretes formed from hydraulic cements, of which portland cement is the most common example, are used as structural components in various applications, such as in the formation of roads, bridge deckings, building structures, multistory automobile storage structures and the like. In order to enhance the properties of the concrete to permit its utilization in these manners, the material normally is used in combination with iron or steel reinforcing structures therein. These reinforcing metal structures, usually in the form of metal rods or bars, are subjected to attack by the various corrosive elements contained in the concrete, as well as by the application of external corrosive elements to the structure, such as chloride salts and the like, which are commonly used in the removal of ice and snow from roads, bridges, pedestrian walkways and the like. Further, various structures located at coastal installations and the like are subject to corrosive salt attack from the environment. The repair and replacement of such structures which have deteriorated due to the effects of such corrosive forces is extensive and in certain instances requires complete replacement of the structure, as it is unsuitable for its intended use.

In attempts to counteract the corrosive effects normally encountered by concrete structures, as discussed above, various corrosion inhibiting agents have been proposed for use as admixtures to be used in their formation. For example, the use of sodium nitrite is disclosed in Japanese Patent, Publication No. 33-940, published Feb. 15, 1958, application Ser. No. 30-33777, filed December 27, 1955, Kano et al. This patent teaches that sodium nitrite can be added to cement and concrete during mixing to inhibit corrosion of reinforcing iron and steel bars and frames. The aggregate used was sea sand.

U.S. Pat. No. 3,210,207, Dodson et al, teaches the use of mixes of calcium formate with minor amounts of certain nitrite or chromate salts as corrosion inhibitors, to be used as accelerators in cements.

U.S. Pat. No. 3,427,175, Angstadt et al, generically discloses the use of calcium nitrite as an accelerator which partially inhibits corrosion in alite cements. The calcium nitrite may contain minor amounts of sodium nitrite and may be used with calcium chloride and other accelerators.

U.S. Pat. No. 3,801,338, Whitaker, teaches the use of a mixture of calcium formate and sodium nitrite for adding to cement which is to contain metal reinforcement. Improved compressive strength is taught, together with sulfate resistance, and has "a positive corrosion inhibition effect."

The use of sodium nitrite, as taught by certain of the above references, has been found to have detrimental effects of efflorescence and to promote alkali-aggregate reaction within the concrete composition and, therefore, to be a poor corrosion inhibiting agent. The use of calcium nitrite is taught by certain references to be an inhibiting agent when used with any type of cement composition. It has been found that calcium nitrite gives only minimum corrosion resistance when used in the manners described and known by the prior art.

The need for a highly effective corrosion inhibition or a cement composition capable of substantially completely inhibiting corrosion of the metal pieces contained therein over a sustained period of time is highly desired by the building and various other industries which utilize this type of material.

SUMMARY OF THE INVENTION

The present invention is directed to a concrete composition which exhibits substantially complete corrosion inhibition with respect to metal pieces contained therein over a sustained period of time and to a method of inhibiting corrosion of said metal pieces. The composition comprises a high strength concrete formed from a hydraulic cement, is capable of exhibiting at least 5000 psi compressive strength at 28 days and contains at least 2 percent calcium nitrite therein.

DETAILED DESCRIPTION OF THE INVENTION

The present invention is directed to concrete compositions which are capable of substantially completely inhibiting corrosion of metal pieces contained therein over a sustained period of time. The compositions comprise an intimate mixture of a hydraulic cement, aggregate and sand to form a high strength concrete composition having the capability of exhibiting at least 5000 psi compressive strength at 28 days and calcium nitrite in an amount of at least 2 percent based on the dry weight of said cement.

The cement components in the present concretes are hydraulic cements, such as, for example, portland cement. These cements are conventionally known and are manufactured by calcining a mixture of limestone and clay to form a clinker, and by grinding the clinker to a fine powder. The major compounds found in portland cement are tricalcium silicate, dicalcium silicate, tricalcium aluminate, and tetracalcium aluminoferrite. The tricalcium and dicalcium silicates are thought to be the principal bonding constituents in the portland cement. Tricalcium silicate, when mixed with water, forms a calcium silicate hydrate known as tobermorite gel and calcium hydroxide. The dicalcium silicate, when contacted with water, forms similar products but at a much lower rate of reaction. The tricalcium silicate, having the greater rate of reaction, determines to a large extent the rate of set of the cement. To provide materials which are suitable for different uses, portland cements having a range of set rates have been found made commercially available. Four general types of portland cements, varying principally in the relative quantities of tricalcium silicate and dicalcium silicate present therein, are commonly produced. The proportions of the principal compounds present in each type of cement are shown in Table I.

TABLE I

|  | Cement type | | |
| --- | --- | --- | --- |
|  | I | II | III |
| Composition, wt. percent: | | | |
| Tricalcium silicate | 53 | 47 | 58 |
| Dicalcium silicate | 24 | 32 | 16 |
| Tricalcium aluminate | 8 | 3 | 8 |
| Tetracalcium aluminoferrite | 8 | 12 | 8 |

Concrete formations encounter various corrosion environments. In some, the environment is an inherent part of the concrete, e.g., as by use of calcium chloride accelerator, or the use of chloride containing materials or chloride containing water. Other environments may be extraneous, e.g., use of calcium chloride and/or salt in snow and ice removal, exposure to salt spray or brines, and the like. Such environments tend to attack and corrode metal pieces within or in contact with the concrete. The instant invention provides a composition and method which inhibit such corrosion.

The critical factors believed to substantially attribute to the unexpected result of achieving substantially complete corrosion inhibition of metal pieces contained in concrete over a sustained period of time are the use of a high strength concrete composition capable of achieving at least 5000 psi compressive strength at 28 days as described hereinbelow in combination with calcium nitrite used in at least 2 percent by weight based on the weight of the dry concrete composition.

The present invention is particularly directed to concrete compositions, in difference to cement pastes or mortar mixes; the cement pastes being composed of a hydraulic cement and water and the mortar mixes being composed of a hydraulic cement, sand and water. These materials so not exhibit the high strength and related properties required by the presently described composition.

The composition of the present invention requires the utilization of a concrete composition which is capable of exhibiting high compressive strength of at least 5000 psi at 28 days as determined by standard tests in this art. (See, for example ASTM). The concrete is a mixture of hydraulic cement, sand and aggregate as a dry mix ready for mixture with water to cause hydration.

The required high strength property of the concrete composition can be achieved by any of a number of methods or of a combination of such methods such as, for example, by varying (a) the water to hydraulic cement ratio used in forming the concrete; (b) the cement content or factor; (c) the hydraulic cement composition, particularly the silicate content therein; (d) the fineness of the particle size of the hydraulic cement used; and (e) the size and distribution of the aggregate used.

High strength concrete compositions as required by the present invention can be formed by having the ratio of water to cement as low a value as can be achieved while permitting mixing of the components. The water to cement ratio should be from 0.25 to 0.5, and preferably between 0.25 to 0.45. The ratio can be lowered without the loss of mixing ability by the utilization of conventional water reducing agents and/or superplasticizers in manners and amounts well known to those skilled in this art.

The subject concrete should have a high cement content or factor; that is to say, at least about 5 to 9 bags (standard 94 lb.) per cubic yard of concrete, preferably from about 6 to 9 bags. The cement compositions which are suitable are hydraulic cements having a high silicate component content. The silicate components in the form of tricalcium silicate ($C_3S$) and dicalcium silicate ($C_2S$) should be of a combined content of from about 50 to 90 percent, and preferably from about 65 to 90 percent.

Another factor contributing to high strength of the resultant concrete composition required by the present invention is the fineness of particle size of the cement used. The cement should have a Blaine fineness between about 3200 to 5000, and preferably between 3200 and 4000 $cm^2/gm$.

The sand and aggregate should meet the specifications as contained in the American Concrete Institute (ACI) Publication 211, which teaching is herein incorporated by reference. High strength concrete is attained by using a maximum amount of large aggregate with a steady gradation of aggregate and sand particles down close to the particle size of the cement in order to achieve substantial complete elimination of voids within the final concrete formation.

The mixture should be made substantially homogeneous and consolidated.

Calcium nitrite, when used in certain amounts and in combination with the above-described concrete, forms a composition which unexpectedly substantially eliminates corrosion to metal pieces contained therein over a sustained period of time and, thus, permits extended life and elimination of repair to concrete formations formed from such compositions. The amount of calcium nitrite required is from at least 2 percent to 3 percent by weight based on the weight of the concrete composition. Higher amounts could be used if economically feasible. Amounts in excess of 5 percent by weight are deemed unnecessary.

The calcium nitrite can be added to the concrete by various techniques. Calcium nitrite can be added to cement clinker prior to grinding and can be thoroughly mixed with the cement component during the grinding step. The calcium nitrite can also be added to the dry concrete mixture and can be thoroughly mixed to uniformly disperse it therein. The calcium nitrite can be dissolved in the water which is used to form the concrete composition. The concrete mixture can be premixed with water and then mixed or contacted with the calcium nitrite. In general, any method of mixing can be used which permits the substantial uniform mixing of the calcium nitrite with the concrete mix prior to its forming a hardened composition.

Other conventional admixtures can be added to the subject composition in manners and amounts commonly known to those skilled in the art. Such admixtures may include, for example, water reducing agents such as calcium lignosulfonate, glucose polymers, polysaccharides, and the like, or super plastisizers such as polynaphthalene sulfonate, polymelamine formaldehyde sulfonate, and the like. Other conventional agents can be used in known manners to the extent that they contribute to the superior properties of the resultant concrete and do not detract from the required compressive strength as described above.

The following examples are given for illustrative purposes only and are not meant to be a limitation on the subject invention except as defined by the claims appended hereto. All parts and percentages are by weight except where indicated otherwise.

EXAMPLE 1

Concrete manufactured by a ready-mix supplier (maximum aggregate size 1″), with a cement factor of 6 sacks per cubic yard, was mixed with 2% calcium nitrite by weight of cement to have a 4 inch slump, 4.8% air content and a compressive strength at 28 days of 5685 pounds per square inch, was placed in a mold measuring 6×2 feet by 6 inches thick, containing a double mat of reinforcing bars (⅝″ diameter), two inches on center running the length of the mold and one inch below the level of the broom-finished concrete.

Seven days after casting, during which entire time the slab was covered with burlap and plastic and kept wet, the mold was removed and the slab was placed on piers three feet off the ground. During the next five weeks, a dam was constructed on the top surface and, at the beginning of the seventh week, 3% sodium chloride solution (1200 milliliters) was spread over the surface daily.

Open-circuit potentials were measured frequently in accordance with the procedures described in *ACI Publication SP*-49, pages 71-82 (1975); *California Transportation Laboratory Research Report* CA-DOT-TL-5116-12-75-03 January 1975; and Uhlig, *Corrosion & Corrosion Control*, page 45 (1971). After approximately six months it was found that the area involved in corrosion (having a more negative potential than −0.350 volts relative to a copper-copper sulfate (CCS) reference electrode) was zero on the deck containing calcium nitrite, and 36.4% of the total area on the blank made from the same components but without calcium nitrite such that the concrete had a 4⅝″ slump, 5.5% air content and 4500 psi strength at 28 days.

EXAMPLE 2

For comparative purposes a concrete, containing 2% calcium nitrite, was made in a 10 cubic foot mixer with ⅝″ maximum size aggregate, 6 sacks per cubic yard cement, 0.56 water/cement ratio 3¼″ slump, 4.6% air, and had a 28-day compressive strength of 4515 pounds per square inch.

After approximately six months, this concrete, which had been cast in a slab in the same manner as described in Example 1, was 93% involved in corrosion, although the blank (no calcium nitrite, 0.57 water/cement ratio 4¾″ slump, 4.5% air, compressive strength at 28 days being 3595 psi) had 100% involvement.

The calcium nitrite exerted some effect in inhibiting corrosion as measured in the same manner as described in Example 1 above. The area having a open-circuit potential between −0.500 and −0.550 with respect to the CCS electrode was 0.3% for the slab containing calcium nitrite and 7.4% for the deck without calcium nitrite. The area registering between −0.450 v and −0.500 v with respect to the CCS electrode was 9.4% for the calcium nitrite slab and 18.5% for the slab without calcium nitrite. Nevertheless, the corrosion inhibiting effect in this series was not as substantially pronounced as in Example 1.

EXAMPLE 3

Again, for comparative purposes, low strength concrete compositions made in substantially the same manner as described in Example 2 above gave the following parameters:

| Inhibited | | Blank |
|---|---|---|
| 6 | Cement Factor, sacks/cu. yd. | 6 |
| 5 | Slump, in. | 4 |
| 0.59 | Water/Cement | 0.57 |
| 4.8 | Air, % | 4.8 |
| 2% | Calcium Nitrite | 0 |
| 71.4% | % Area involved in Corrosion | 100 |

Although corrosion was lessened by the use of calcium nitrite, the unexpected substantially complete inhibition was not attained.

EXAMPLE 4

Concrete made essentially as in Example 2 but with the addition of 3 fluid ounces of calcium lignosulfonate-based water reducer, gave the following parameters:

| Inhibited | | Blank |
|---|---|---|
| 6 | Cement Factor, sacks/cu. yd. | 6 |
| 5.5 | Slump, in. | 5.5 |
| 0.55 | Water/Cement | 0.53 |
| 5.2 | Air, % | 5.8 |
| 6245 | 28 day Compressive Strength, psi | 5115 |
| 2% | Calcium Nitrite | 0 |
| 0% | % Area involved in Corrosion at 6 months | 27.6% |
| nil | % Area involved in Corrosion at 19 months | 100% |

One month test is approximately equal to one year of a Kansas winter.

From these samples it can be seen that even though both the blank and the calcium nitrite containing samples exhibited high compressive strengths, only the latter exhibited substantially no corrosion after a sustained period of time.

What is claimed is:

1. A method of substantially completely inhibiting the corrosion of metal pieces contained in a reinforced concrete structure comprising forming an unset concrete composition by substantially uniformly mixing a concrete mixture formed from hydraulic cement, sand, aggregate and water with at least 2 percent calcium nitrite by weight based on the dry weight of the cement content contained in said concrete mixture wherein the concrete composition is capable of exhibiting a compressive strength of at least 5000 psi at 28 days; embedding metal pieces in said unset concrete composition while forming a shaped structure; and permitting said composition to set.

2. The method of claim 1, wherein the amount of calcium nitrite in said concrete composition is from 2 to about 3 percent.

3. A reinforced concrete structure formed from a high strength concrete mixture having metal pieces embedded therein; said concrete mixture formed from hydraulic cement, sand, aggregate, water with at least 2 percent calcium nitrite based on the dry weight of the cement content of said concrete mixture and said mixture being capable of exhibiting compressive strength of at least 5000 psi at 28 days of cure.

4. The structure of claim 3 wherein the calcium nitrite is present in from 2 to 3 percent based on the dry weight of the cement.

5. The structure of claim 4, wherein the concrete mixture is formed from a hydraulic cement having a combined silicate component of from about 50 to 90 percent, a cement content of at least 5 to 9 bags, a cement to water ratio of from 0.25 to 0.5 and a Blaine fineness of between about 3200 to 5000 cm²/gm in such combination such that the resultant concrete composition exhibits a compressive strength of at least 5000 psi at 28 days.

6. The structure of claim 5 which further contains a superplasticizer therein.

7. The structure of claim 5 which further contains a water reducing agent therein.

8. The method of claim 2 wherein the unset concrete composition is formed from a hydraulic cement having a high combined silicate ratio of from about 50 to 90 percent, a cement content of at least 5-9 bags, a cement to water ratio of from 0.25 to 0.5, and a Blaine fineness of between about 3200 to 5000 cm²/gm in such combination such that the resultant concrete composition exhibits a compressive strength of at least 5000 psi at 28 days.

9. The method of claim 8 wherein the unset concrete composition contains a superplasticizer.

10. The method of claim 8 wherein the unset concrete composition contains a water reducing agent.

* * * * *

UNITED STATES PATENT AND TRADEMARK OFFICE
CERTIFICATE OF CORRECTION

PATENT NO. : 4,285,733
DATED : August 25, 1981
INVENTOR(S) : Arnold M. Rosenberg and James M. Gaidis It is certified that error appears in the above-identified patent and that said Letters Patent are hereby corrected as shown below:

In Item 75 of the cover page the name "James M. Caidis"
    should read -- James M. Gaidis --.

In Col. 7, lines 4-5 and in Col. 8, lines 4-5, the phrase
    "cement to water" should read -- water to cement --.

Signed and Sealed this

Twenty-fourth Day of November 1981

[SEAL]

Attest:

GERALD J. MOSSINGHOFF

Attesting Officer

Commissioner of Patents and Trademarks